May 24, 1960 F. S. WEZNER 2,937,535

RESET MECHANISM

Filed Nov. 21, 1958

INVENTOR
FRANKLIN S. WEZNER

BY G. W. O'Brien
Claude Funkhouser
ATTORNEYS

United States Patent Office 2,937,535 Patented May 24, 1960

2,937,535

RESET MECHANISM

Franklin S. Wezner, Haddonfield, N.J., assignor, by mesne assignments, to the United States of America as represented by the Secretary of the Navy Filed Nov. 21, 1958, Ser. No. 775,665

5 Claims. (Cl. 74—10.41)

The present invention relates to reset mechanisms and more particularly to a new and improved reset and shaft coupling device for quickly connecting a control knob or pointer to a controlled device or disconnecting same therefrom and in which means are provided for automatically resetting or returning the pointer to its original or zero position in the event that the pointer has been accidently moved therefrom.

While the invention may be used in conjunction with many types of equipment, it will be described in relation to electronic equipment, for example, power operated appliances, such as radio receivers, television receivers, record players, recorders, and similar equipment provided with a chassis for supporting conventional electronic components and removable from a fixed casing, panel or frame in a transverse direction. Moreover, the invention contemplates the provision of a reset device for quickly disconnecting the driving connection between a control knob or pointer and an electronic component, such for example, as a potentiometer, as the chassis carrying the potentiometer is removed from a fixed frame or a panel, and for effecting return of the control knob to its initial or zero position without effecting operation of the potentiometer when the chassis is replaced in the frame or panel regardless of the number of times this operation occurs.

An object of the present invention is to provide a new and improved clutch or shaft coupling device for quickly establishing a driving connection between an indicator pointer and a control device.

Another object of the invention is to provide a reset device applicable when its is necessary to remove a chassis or part in a transverse direction from a fixed frame or panel member.

Still another object of the invention is to provide a reset device wherein a control knob rotatably mounted on a fixed frame and directly related to a circuit operating element mounted on a removable chassis will be invariably returned to an initial or zero position when the chassis is replaced in the fixed frame without effecting operation of the circuit operating element.

A still further object of the invention is to provide a clutch or shaft coupling device having driving means which are readily detachable during removal of a chassis from a fixed frame and which are readily attachable during the replacement of the chassis within the frame.

Other objects and many of the attendant advantages of this invention will be readily appreciated as the same becomes better understood by reference to the following detailed description when considered in connection with the accompanying drawings wherein.

Figure 1:
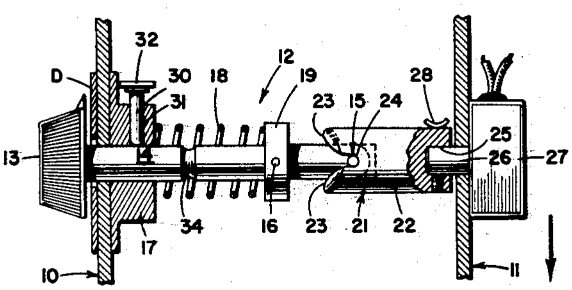
Fig. 1 is a partial sectional view illustrating the reset mechanism operatively connected to and in driving connection with a control element, with the supporting structure for the coupling shown fragmentarily.

Referring to the drawings and more particularly to Fig. 1, there is shown a fixed panel or frame 10 and a removable chassis 11, such for example, as the type used in radio receivers and upon which is supported a reset device constructed in accordance with the present invention and generally indicated by the reference character 12, the chassis being removable from the frame in a transverse direction, as indicated by the arrow.

Figure 3:
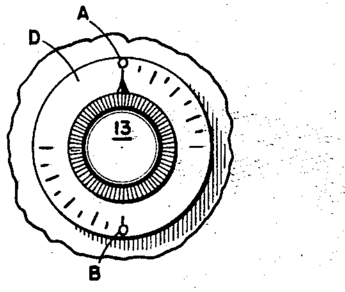
Fig. 3 is an elevation view illustration of a knob or pointer in connection with a conventional dial, with the knob or pointer in an initial position.

The device of the present invention comprises a knob or pointer 13 secured to one end of a shaft 14 in any conventional manner and adapted to cooperate with a dial D mounted on the frame 10. The dial D is of any conventional type and having suitable graduations over which the pointer travels as best shown in Fig. 3. The other end of the shaft is provided with a pin 15, the terminal ends thereof extending beyond the shaft 14, as indicated at 16. The shaft 14 is rotatably supported in a bearing member 17 mounted on frame 10 and secured thereto, such as by screws or the like. The shaft 14 has a coil spring 18 disposed about a portion thereof, one end of the spring being in engagement with a collar or stop 19 formed on aforesaid shaft, the other end thereof being in engagement with the member 17. By this arrangement the pin 15 is urged toward a coupling member generally indicated by the numeral 21.

Figure 2:
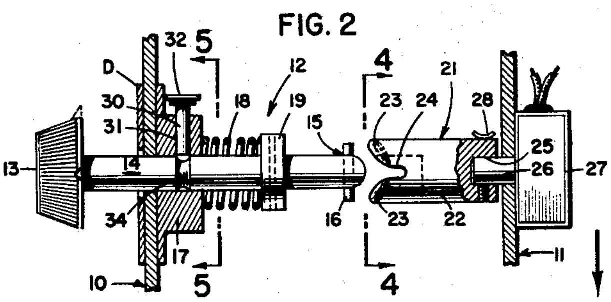
Fig. 2 is a view similar to Fig. 1 illustrating the coupling disconnected.
Figure 4:
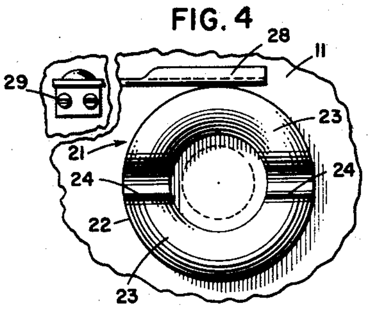
Fig. 4 is an enlarged sectional view taken on the line 4—4 of Fig. 2.

The member 21 comprises a stud 22, as best shown, on Figs. 1 and 2, the stud being provided with a pair of cams 23 terminating in a slot 24, the cams being constructed and arranged to impart rotary movement to the shaft 14, as the pin 15 engages and travels along the aforesaid cams and into the slot 24. This cam and pin arrangement may be best seen in Figs. 6 and 7. The stud 22 is further provided with a recess 25 for receiving an actuating member 26 of a controlled device 27, such for example, as a potentiometer or the like, the potentiometer being secured to the chassis 11 in any conventional manner. As more clearly shown in Fig. 4, the stud 22 is maintained in an initial position by a spring 28, one end of the spring being in engagement with the stud, the other end thereof being carried by the chassis, as at 29. Thus, by this arrangement, considerable force must be used to rotate the stud 22 when the pin 15 is in driving engagement with slot 24, as best shown in Fig. 1.

Figure 5:
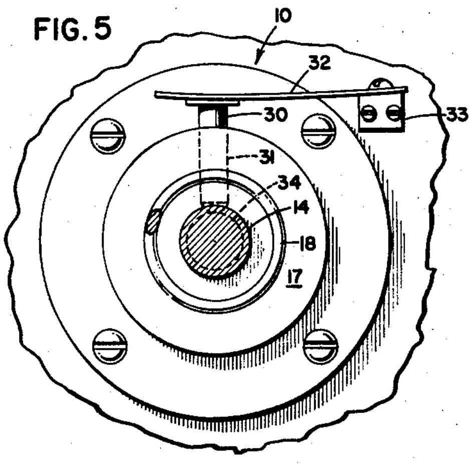
Fig. 5 is an enlarged sectional view taken on the line 5—5 of Fig. 2.

Referring now to Figs. 1 and 2, it will be noted that a detent or retaining element 30 is arranged within a bore 31 formed in member 17 and urged toward the shaft 14 by a spring 32, one end of the spring being in engagement with the detent 30, the other end thereof being carried by the panel or frame 10, as at 33, Fig. 5.

As more clearly shown on Fig. 2, the detent 30 cooperates with an annular groove 34 formed in shaft 14 for locking and maintaining the shaft in a position such that the pin 15 is disengaged from the slot 24 in stud 22.

It will be noted in Fig. 1 that the spring 18 maintains the pin 15 in slot 24 to provide a driving connection between shaft 14 and stud 22. Spring actuated detent 30 locks the shaft 14 in its retracted position to maintain the pin 15 out of engagement with slot 24. With the shaft in the retracted position, the chassis may be readily removed or replaced in the frame or casing 10.

It will be understood that when the aforesaid components of the device are in the position, as in Fig. 2, and upon release of detent 30 from locking engagement with shaft 14, the shaft will be forcibly urged toward cam surfaces 23 on stud 22. Thus, when the pin 15 engages and travels thereover, rotary movement is imparted to shaft 14 until the pin seats in slot 24. During this coupling action stud 22 does not rotate since the stud is held against rotation by spring 28. When pin 15 is seated in slot 24, however, rotation of stud 22 is effective through the aforesaid driving connection when a sufficient amount of force is applied to knob or pointer 13 to overcome the force of spring 28 whereupon the device 27 may be operated at will to a selected position.

Figure 6:
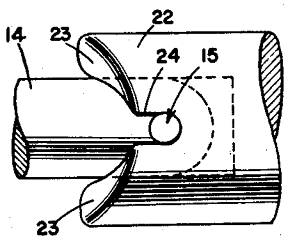
Fig. 6 is a fragmentary view illustrating the driving connection between a coupling shaft and cam shaft.
Figure 7:
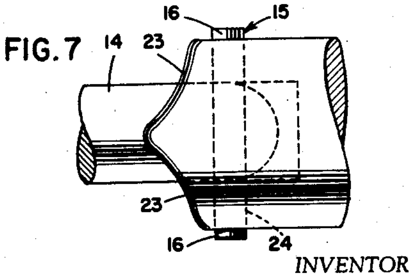
Fig. 7 is a view similar to Fig. 6, as seen at a right angle with respect thereto.

By the aforesaid double cam arrangement, as more clearly shown on Figs. 6 and 7, the pointer 13 will be returned to either of two zero positions, such for example, as at A and B, Fig. 3 when the chassis is replaced in the frame and upon initial rotation of shaft 14 by the pin and cam arrangement and in the event that the pointer for any reason has moved from its zero positions during removal of the chassis from the frame.

Figure 8:
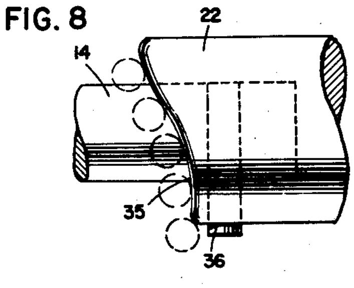
Fig. 8 is an alternate form of the driving connection of Fig. 1.

Referring to the arrangement of Fig. 8, it will be noted that stud 22 is provided with a single cam surface 35 which cooperates with a single pin 36 carried by shaft 14. By this arrangement and upon release of shaft 14, in the manner heretofore set forth, pin 36 engages and rides along cam surface 35, thereby rotating shaft 14 which in turn moves the knob 13 to its original or zero position. It will be understood that this operation occurs after the chassis is replaced in the frame and thus proper synchronism between the pointer and the control device is established.

From the foregoing description it will be apparent that a new and improved reset mechanism has been devised wherein means are provided for quickly disconnecting a pointer or knob carried by a fixed frame from a control device carried by a chassis when removal of the chassis from the frame is necessary and in which means are provided for returning or resetting the pointer or knob to its original or zero positionafter the chassis is replaced in the frame and in the event that the pointer or knob has been accidentally moved from the zero position.

Obviously many modifications and variations of the present invention are possible in the light of the above teachings. It is therefore to be understood that within the scope of the appended claims the invention may be practiced otherwise than as specifically described.

What is claimed is:

1. A reset mechanism comprising a movable spring biased element having a driving pin carried thereby, an actuating member having a slot therein for receiving said pin on said element to provide a driving connection between the element and member as the element is moved a predetermined amount, a pair of cam surfaces on said member engaged by said pin during the movement of said element for effecting rotation of said element to an initial position in the event that the element has been accidentally moved from said initial position and during the establishment of said driving connection between said element and the member, means on said element for effecting rotation of said actuating member through said pin and slot when said driving connection is established, and locking means yieldably engaging said element for maintaining said pin out of engagement with said slot until said locking means is released.

2. A mechanical connection according to claim 1, including yieldable means in engagement with said actuating member for preventing movement of said member during the establishing of said driving connection between said element and the member.

3. A reset mechanism comprising, a spring biased shaft movable from an initial position to an operating position, a pin carried by said shaft, an actuating shaft cooperating with said spring biased shaft, a slot formed in said actuating shaft for receiving said pin on said spring biased shaft to provide a driving connection therebetween as the spring biased shaft moves from said initial position to operating position, a pair of cam surfaces on said actuating shaft engaged by said pin on said spring biased shaft during said movement thereof for effecting initial rotation of said spring biased shaft to an initial position in the event that said spring biased shaft has been accidentally moved from said initial position and during the establishment of said driving connection between said spring biased shaft and the actuating shaft, a resilient element in engagement with said actuating shaft for preventing rotation thereof during said initial rotation of the spring biased shaft, a knob on said spring biased shaft for effecting rotation of said actuating shaft through said pin and slot after said initial rotation of said spring biased shaft, means carried by and controlled by said actuating shaft as the actuating shaft is rotated, a detent yieldably engaging said spring biased shaft for locking the spring biased shaft in a position such that said pin is disengaged from the slot, and a spring in engagement with said detent for yieldably urging the detent into locking engagement with said spring biased shaft.

4. In a reset mechanism, the combination comprising a transversely removable and replaceable chassis housed in a frame, a first shaft slidably and rotatably supported on said frame, a second shaft rotatably supported on said chassis, a transversely disposed pin carried by said first shaft, a transversely disposed slot in said second shaft and engaged by said pin for providing a driving connection between said first and second shafts, spring means on said first shaft for maintaining said driving connection between said shafts, means on said frame for locking said first shaft in a position to disconnect the driving connection therebetween and the first shaft during removal from and replacement of the chassis in the frame, a pointer indicator carried by said first shaft for effecting rotation of said first and second shafts when said driving connection therebetween is established and said indicator is moved from an initial position to a selected position, pin guiding and actuating surfaces on said second shaft and inclined toward and bordering on said slot for initially rotating said first shaft with respect to said second shaft an amount sufficiently to return said pointer indicator to said initial position as said pin engages and rides over said cam surfaces and into said slot in response to movement of the second shaft by said spring means and upon release of said second shaft, means on said frame and cooperating with said pointer indicator for giving a visual indication when said pointer indicator is in said initial position, and control means on said chassis and connected to and operated in response to said rotation of said shafts.

5. The combination as defined by claim 4 in which the second shaft includes a spring having one end in engagement therewith and the other end carried by said chassis for maintaining the shaft in an initial position during rotation of said first shaft with respect to said second shaft.

References Cited in the file of this patent

UNITED STATES PATENTS

| | | |
|---|---|---|
| 1,511,651 | Brake | Oct. 14, 1924 |
| 2,684,142 | Willyard et al. | July 20, 1954 |

FOREIGN PATENTS

| | | |
|---|---|---|
| 151,438 | Sweden | Sept. 13, 1955 |
| 728,697 | France | July 9, 1932 |
| 923,442 | Germany | Feb. 14, 1955 |